(12) United States Patent
Pantzar

(10) Patent No.: US 7,112,021 B2
(45) Date of Patent: Sep. 26, 2006

(54) TOOL COUPLING FOR ROTATING TOOL

(75) Inventor: Göran Pantzar, Arsunda (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/502,767

(22) PCT Filed: Jan. 28, 2003

(86) PCT No.: PCT/SE03/00142

§ 371 (c)(1),
(2), (4) Date: Oct. 19, 2004

(87) PCT Pub. No.: WO03/064086

PCT Pub. Date: Aug. 7, 2003

(65) Prior Publication Data

US 2005/0095076 A1    May 5, 2005

(30) Foreign Application Priority Data

Jan. 29, 2002 (SE) .................... 0200236

(51) Int. Cl.
*B23B 51/00* (2006.01)
*B23C 6/26* (2006.01)
(52) U.S. Cl. .......................... 409/234; 409/232; 279/8; 408/239 R
(58) Field of Classification Search ............... 409/234, 409/232, 233; 464/151, 147, 146, 143, 104; 407/34, 40; 192/108; 411/417, 418; 279/8; 408/231, 233, 238, 239 R, 713
See application file for complete search history.

(56) References Cited

U.S. PATENT DOCUMENTS

| 4,621,960 | A |   | 11/1986 | Töllner |
|---|---|---|---|---|
| 4,655,655 | A | * | 4/1987 | Schurfeld .................... 409/232 |
| 4,854,764 | A | * | 8/1989 | Faber et al. ................. 409/234 |
| 4,929,131 | A | * | 5/1990 | Allemann .................... 409/234 |
| 4,934,883 | A |   | 6/1990 | Andersson et al. |
| 5,026,224 | A | * | 6/1991 | Andersson et al. ......... 409/234 |
| 5,158,407 | A | * | 10/1992 | Zettl .......................... 409/234 |
| 5,551,811 | A | * | 9/1996 | Satran et al. ................. 407/40 |
| 5,607,263 | A | * | 3/1997 | Nespeta et al. ............. 408/233 |
| 5,904,455 | A | * | 5/1999 | Krenzer et al. ............. 408/230 |
| 6,059,492 | A |   | 5/2000 | Hecht |
| 6,276,879 | B1 |   | 8/2001 | Hecht |
| 6,540,449 | B1 | * | 4/2003 | Bejerstål et al. .............. 407/40 |

* cited by examiner

*Primary Examiner*—Monica Carter
*Assistant Examiner*—Dana Ross
(74) *Attorney, Agent, or Firm*—Drinker Biddle & Realth LLP

(57) ABSTRACT

A tool assembly includes first and second tool bodies, a tool coupling interconnecting the tool bodies, and a drawing member for drawing the tool bodies together along a common longitudinal axis. The tool coupling includes a male portion disposed on one of the first and second tool bodies, and a female portion disposed in another of the first and second tool bodies and receiving the male portion. The tool coupling also includes a ridge disposed on one of the first and second tool bodies and a groove disposed in another of the first and second tool bodies and receiving the ridge for radially steering the first and second tool bodies during mating of the male and female portions.

12 Claims, 3 Drawing Sheets

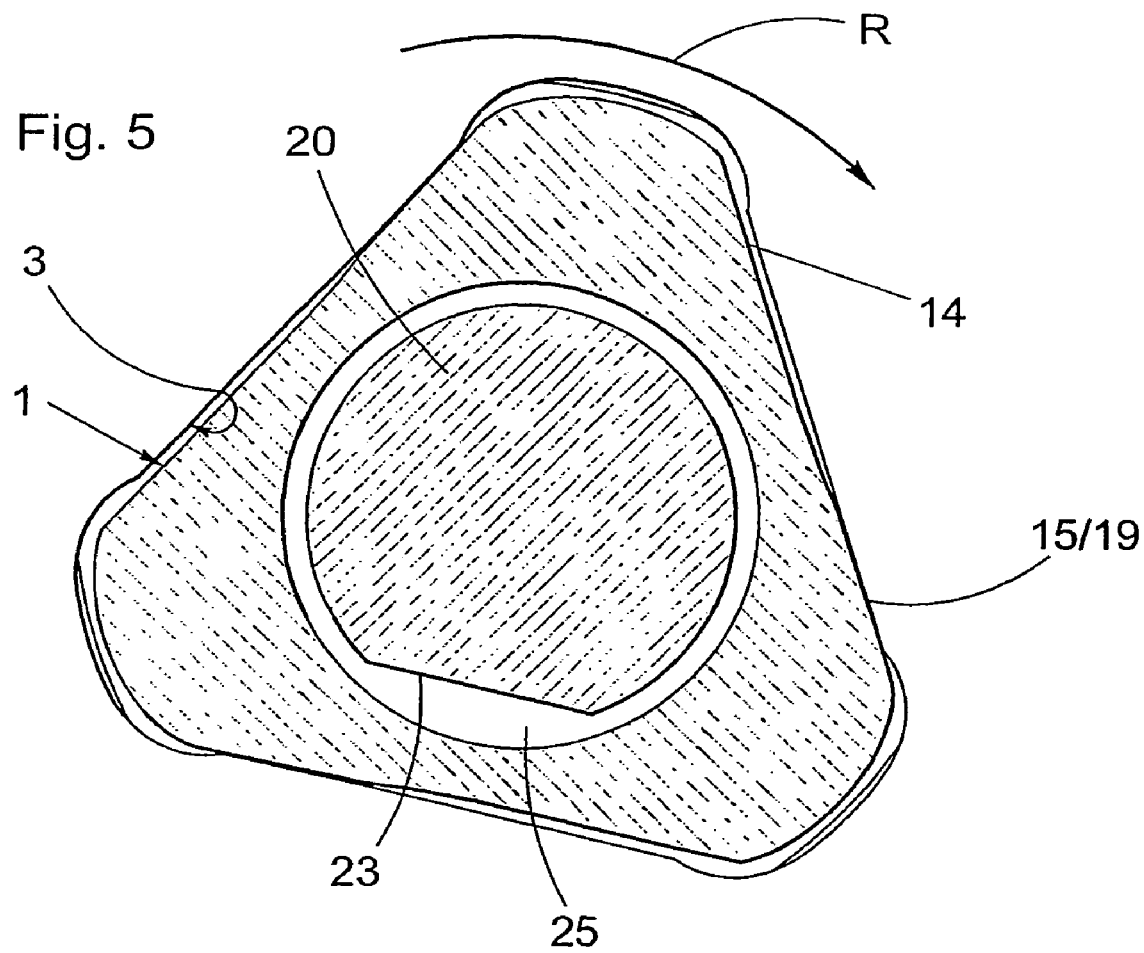

TOOL COUPLING FOR ROTATING TOOL

TECHNICAL FIELD OF THE INVENTION

The present invention relates to a tool coupling for rotary tools for chip removing machining, which tool coupling is intended to interconnect a first tool body and a second tool body. The tool coupling comprises a male part arranged on the first tool body and a female part arranged on the second tool body, whereby the male part and the female part being intended to be in engagement with each other in the operative state of the tool coupling. The tool coupling comprises members arranged to apply an axial, uniting force to the male part and the female part.

PRIOR ART

A tool coupling where a male part cooperates with a female part is previously known from SE-B-457 623 (corresponding to U.S. Pat. No. 4,934,883), whereby the parts are tapering and have non-circular cross-sections. In the operative position of the tool coupling, the male part is received in the female part and at final displacement of the male part in relation to the female part, an elastic deformation of the female part takes place in the area of the open end thereof. Any additional steering (guiding) in the radial direction of the tool coupling, apart from the mutual steering between the male part and the female part, is not to be found in the tool coupling according to SE-B-457 623.

A tool which comprises a male part and a female part, which are conical with a cylindrical cross-section coupling is previously known from U.S. Pat. No. 4,621,960. Furthermore, the tool coupling comprises driver members in the form of pins, which co-operate with recesses. An axially extending screw provides engagement between the male part and the female part, whereby contact is also established between stop faces included in the tool coupling, which are situated at a radial distance from the male and female parts. Said stop faces do not provide any steering in the radial direction of the tool coupling.

Aims and Features of the Invention

A primary aim of the present invention is to provide a tool coupling of the kind defined in the introduction, which coupling is free of play.

An additional aim of the present invention is that the coupling should ensure a high precision, especially in the radial direction with regard to the chip removing machining which is carried out by the cutting inserts for chip removing machining applied on the tool head.

Yet another aim of the present invention is that the tool coupling according to the present invention should be user-friendly as well as automatically adjust the tool bodies which are connected together in mutually correct positions.

At least the primary aim of the present invention is attained by a tool assembly comprising first and second tool bodies, a tool coupling interconnecting the first and second tool bodies, and a drawing member for drawing the first and second tool bodies together along a common longitudinal axis of the first and second tool bodies. The tool coupling comprises a male portion disposed on one of the first and second tool bodies, and a female portion disposed in another of the first and second tool bodies and receiving the male portion. The tool coupling also comprises a ridge disposed on one of the first and second tool bodies and a groove disposed in another of the first and second tool bodies and receiving the ridge for radially steering the first and second tool bodies during mating of the male and female portions. The ridge and the groove are situated laterally outwardly of the male and female portions.

BRIEF DESCRIPTION OF THE DRAWINGS

Below, two embodiments of the invention will be described, reference being made to the appended drawings, where:

FIG. 5 shows a section, perpendicularly to the axial direction of the tool bodies, through the male part and the female part when the same are in engagement with each other.

DETAILED DESCRIPTION OF A PREFERRED EMBODIMENT OF THE INVENTION

Figure 1:
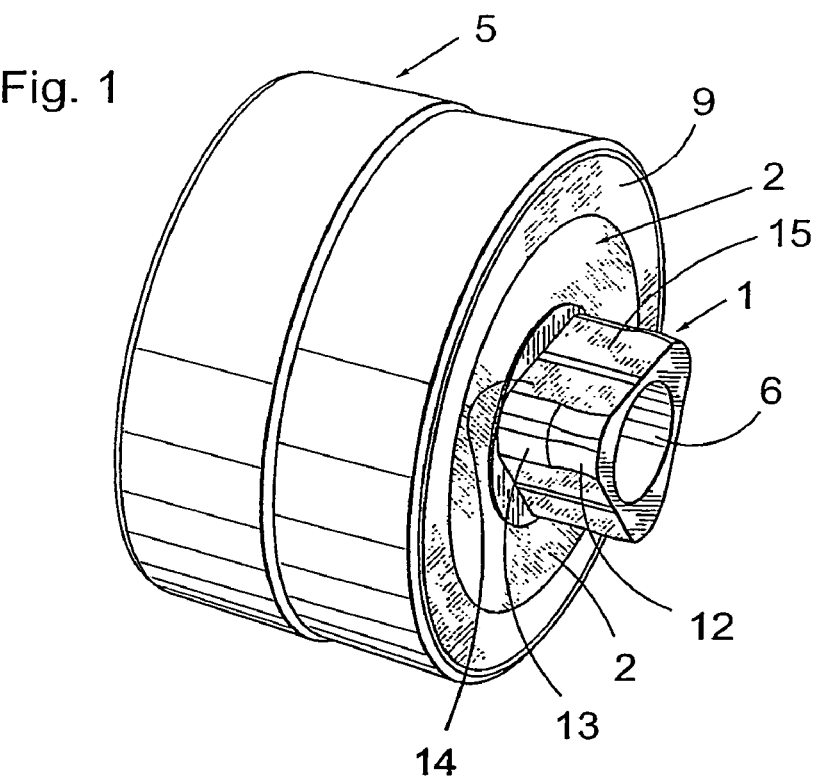
FIG. 1 shows a perspective view of a male part included in the tool coupling according to the present invention, which is arranged on a first tool body.
Figure 2:
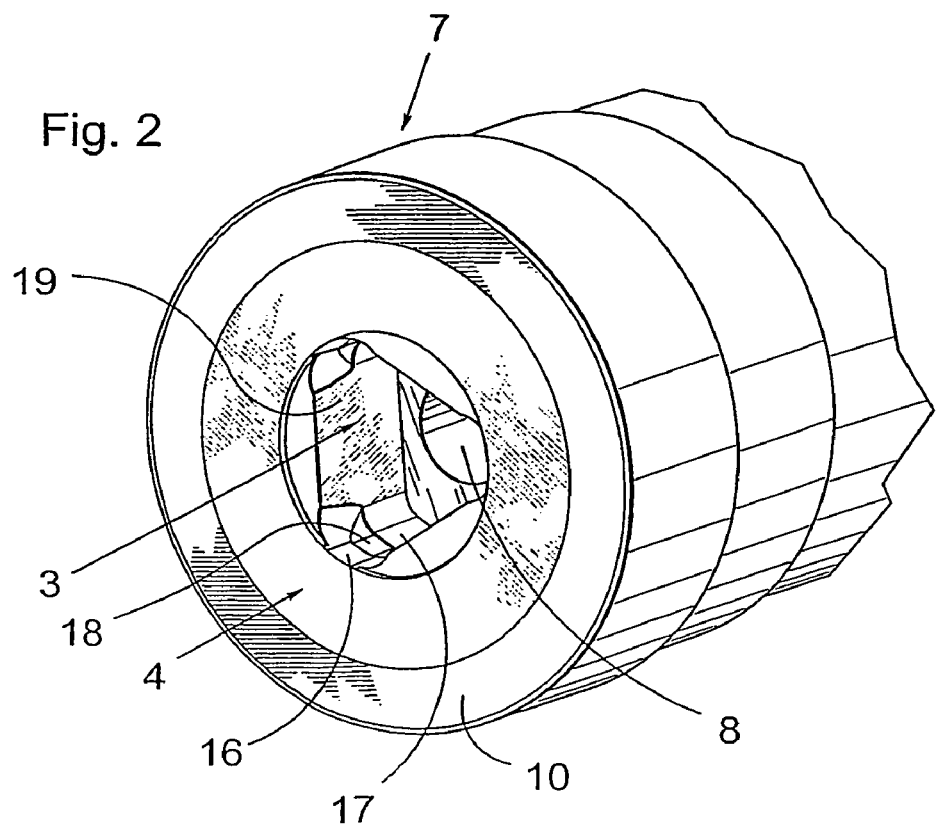
FIG. 2 shows a perspective view of a female part included in the tool coupling according to the present invention, which is arranged on a second tool body and intended to be in engagement with the male part according to FIG. 1.
Figure 3:
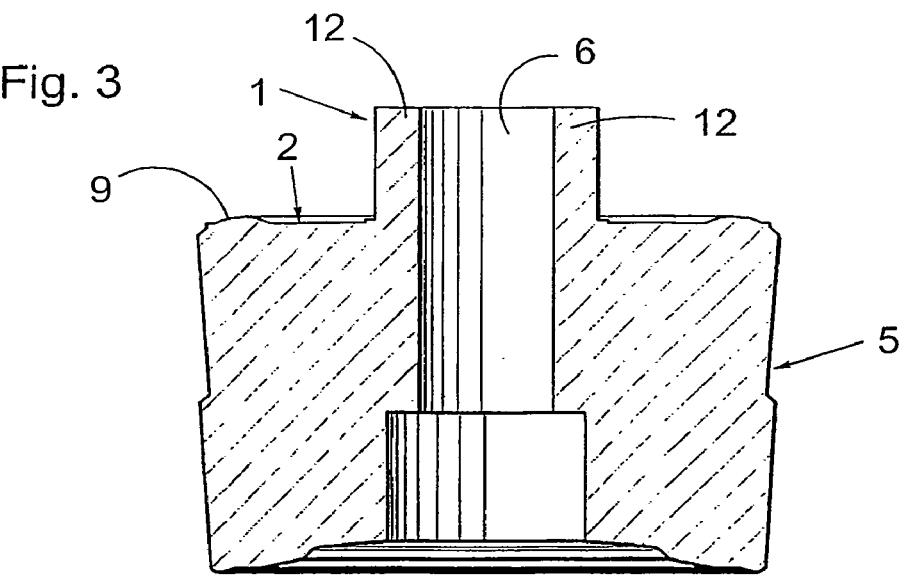
FIG. 3 shows an axial cross-section through the center of the first tool body according to FIG. 1.

The embodiment of a tool coupling according to the present invention illustrated in FIGS. 1 and 2 comprises a male part 1, see FIG. 1, and a female part 3, see FIG. 2. The male part 1 is arranged on a first contact surface 2 of a 15 first tool body 5 and the female part 3 is formed in a second contact surface 4 of a second tool body 7. The first tool body 5 may, for instance, consist of a cutter head while the second tool body 7 may, for instance, consist of an extender or the like. At the end facing away from the female 20 part 3, the second tool body 7 may be provided with some other type of tool coupling, for instance the tool coupling CORO-MANT CAPTO® marketed by AB Sandvik Coromant. The tool bodies 5 and 7 are only schematically illustrated in the present patent application.

In the embodiment illustrated, an axial first center hole 6 extends through the first tool body 5 and an axial second center hole 8 extends through at least a part of the second tool body 7. The first center hole 6 is provided with a step or shoulder 6a while the second center hole 8 is internally threaded.

Furthermore, the tool coupling according to the present invention comprises a steering arrangement which in the embodiment according to FIGS. 1 and 2 comprises a circular ridge 9, which is arranged on the first contact surface 2 at a certain radial distance from the male part 1, in connection with the circumference of the first tool body 5. Furthermore, the steering arrangement comprises a circular groove 10, which is arranged in the second contact surface 4 at a certain radial distance from the female part 3, in connection with the circumference of the second tool body. How the circular ridge 9 cooperates with the circular groove 10 will be clear from the description below.

The male part 1 shown in FIG. 1 is of a generally triangular shape with axially adjacent rounded corner portions 12 and 13, whereby the corner portion 12 situated axially farthest out is convex both in the direction of circumference of the male part and also in the axial direction of the male part 1. Between adjacent ones of the corner portions 12, 13, the male part has two partial side surfaces 14 and 15, the first partial side surface 14 of which is plane while the second partial side surface 15 is convex in the direction of circumference of the male part 1. This is seen more clearly in the cross-section that is shown in FIG. 5.

The female part 3, see FIG. 2, comprises a recess that has also a generally triangular shape with rounded corners, whereby said corner comprises two part portions 16 and 17. The first corner portion 16 has a bottom which is situated closer to the circumference of the second tool body 7 (i.e., farther from the center axis) than is the bottom of the second corner portion 17. Also, the bottom of the first corner portion 16 is disposed closer to a mouth (open end) of the recess than is the bottom of the second corner portion 17. Between the bottoms of the corner portions 16 and 17, a transition portion 18 is arranged, which has an extension in the axial direction of the second tool body 7. Between the respective corner portions 16/17, a side surface 19 extends, which preferably is planar.

The male part shown in FIG. 1 fits into the female part 3 shown in FIG. 2 thanks to a slight play between the male part 1 and the female part 3. The means that the male part 1 is not actively steered in the radial direction when the same is received in the female part 3 but the radial steering only takes place through the circular ridge 9 cooperating with the circular groove in a way that will be described more in detail below.

Figure 4:
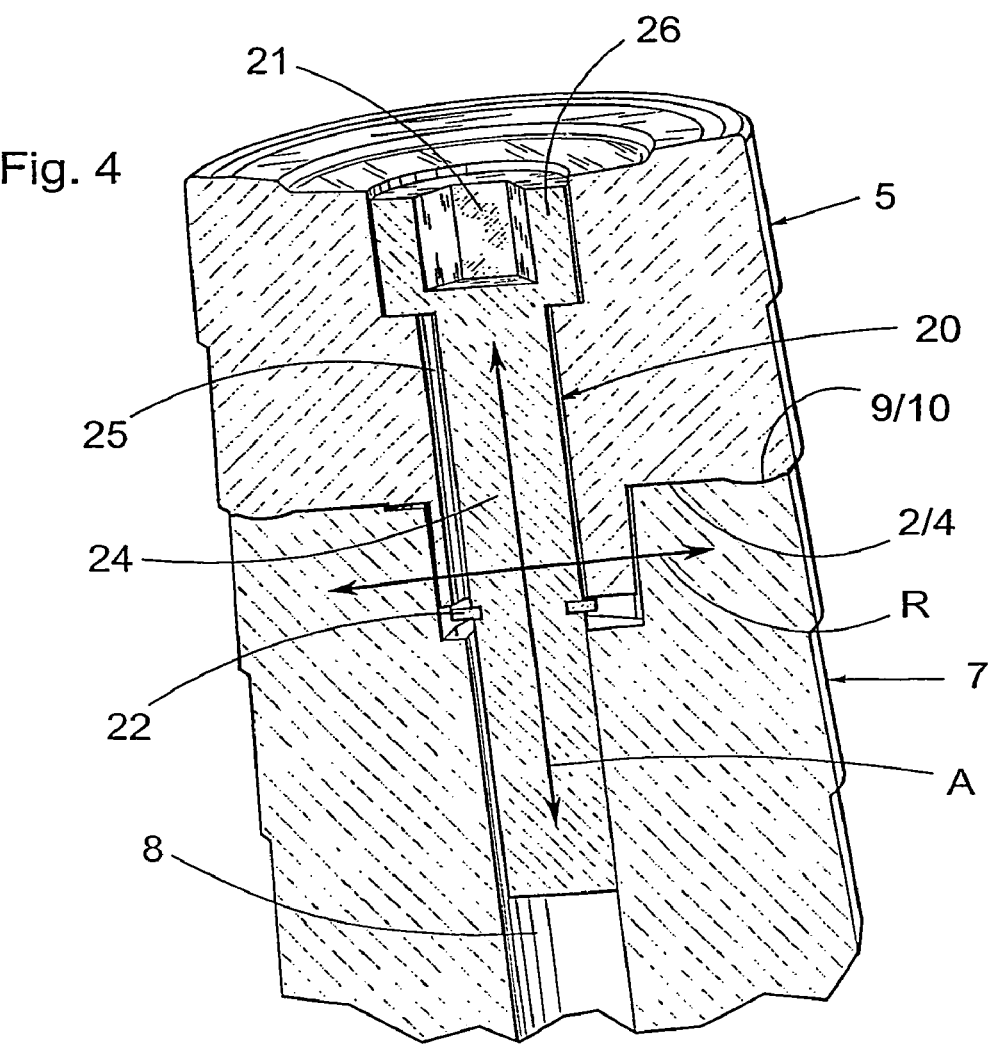
FIG. 4 shows in perspective the two tool bodies in an assembled state, whereby the same are cut axially through the center of the tool bodies.

In FIG. 4, the two tool bodies 5 and 7 are shown in connected position, i.e. the male part 1 is received in the female part 3, whereby the contact surfaces 2 and 4 abut against each other and the circular ridge 9 is received in the circular groove 10. A double arrow A symbolizes the axial direction of the tool while a double arrow R symbolizes the radial direction of the tool. An externally threaded locking screw 20 extending axially is received in the first hole 6 and extends into the second hole 8. The locking screw 20 is in the usual way provided with an internal key recess 21 in order to enable rotation of the locking screw 20, and thereby effect connection of the tool bodies 5 and 7 in a satisfactory way. The locking screw 20 is also provided with a clamp ring 22 which is received in a radial groove in the locking screw 20. The function of said clamp ring 22 will be described below.

Thus, when connecting the two tool bodies 5 and 7 the male part 1 is inserted into the female part 3, whereby during the initial stage the corner portions 12, 13 of the male part bear against the first corner portions 16 and 17 of the female part 3. The displacement of the male part 1 into the female part 3 is effected by rotation of the locking screw 20, whereby the external threaded portion thereof is in engagement with the internally threaded hole 8. When the male part 1 has bottomed in the female part 3, the partial side surfaces 14 and 15 of the male part 1 are exactly opposite the side surface 19 of the female part 3. At this stage, also the contact surfaces 2 and 4 have come to abutment against each other, whereby the ridge 9 of the first tool body 5 is received in the groove 10 of the second tool body 7. By cooperation between the ridge 9 and the groove 10, a mutual steering (guiding) in the radial direction of the two tool bodies 5 and 7 will be effected. By virtue of the play between the male part 1 and the female part 3, which is brought about by a certain play between the partial side surfaces 14, 15 and the side surface 19 (see FIG. 5), the steering which is achieved by the ridge 9 and the groove 10 will prevail over the steering which is achieved by the corner portions 13, 14, 16, 17 and the partial side surfaces 14, 15 and the side surface 19, respectively. Preferably, in the sectional view illustrated in FIG. 4, the ridge 9 has a somewhat smaller curvature radius than the groove 10. As a consequence the requirements regarding precision of the ridge 9 and the groove 10 in practical manufacture is somewhat reduced.

In this connection, it should be pointed out that when a lateral force is applied to the first tool body 5, a mutual lateral displacement of the tool bodies 5, 7 will to an exceptionally high extent be counteracted by cooperation between the ridge 9 and the groove 10 thanks to the same being kept axially together by the locking screw 20.

When a rotation is applied to the second tool body 7, the female part 3 will naturally also rotate, whereby the male part 1 and the first tool body 5 are driven along. In this connection reference is made to FIG. 5, which shows a section through the male part 1 and the female part 3 in the operative position of the same parts. As is seen in FIG. 5, where the direction of rotation is marked with R, upon rotation of the female part 3, the side surface 19 will contact the convex part side surface 15, whereby the rotational force is transferred via said three contact areas 15/19.

In FIG. 5 shows clearly that the locking screw 20 is provided with a longitudinal chamfer 23, which preferably extends along the entire shank 24 of the locking screw 20. Said chamfer 23 provides a space 25 between the shank of the locking screw 20 and the holes 6 and 8, whereby cooling medium may be supplied into said space. How the cooling medium is distributed further in the area of the head 26 of the locking screw 20 is not illustrated in FIG. 4. In this connection, it should be pointed out that the design of the locking screw 20, i.e., the arrangement of a longitudinal chamfer 23 may have a general application for tools for chip removing machining where it is important to provide a space for supply of cooling medium.

When the first tool body 5 is to be dismounted from the second tool body 7, the locking screw 20 is rotated in the opposite direction in comparison with when the tool bodies 5, 7 are connected. Then, the clamp ring 22, which projects a distance outside of the circumference of the shank 24, will come into abutment against the first tool body 5 and pulls the same with it, whereby the male part 1 is removed from the female part 3.

In the above-described embodiment of the present invention, the tool bodies 5 and 7 are schematically illustrated in the form of generally cylindrical elements. However, the fact is that in reality the tool bodies 5 and 7 are machined to shapes depending on which type of tool they are included in. Then, the periphery of said tool bodies 5 and 7 will normally be interrupted here and there, which in turn means that the circular ridge 9 and the circular groove 10 on the completed tool will not be continuous but interrupted here and there, i.e., the ridge and groove would comprise arc-shaped segments.

Feasible Modifications of the Invention

In the above-described embodiments, the male part 1 is arranged on the first tool body 5, i.e. the part which, for instance, may constitute a cutter head. However, within the scope of the present invention it is also feasible that the female part 3 could be formed in the first tool body 5, whereby in such a case the male part 1 would be arranged on the second tool body, which for instance may constitute an extender.

In the above-described embodiment, the ridge 9 and the groove 10 are circular, whereby, for reasons that have been given above, they may be interrupted here and there. However, the ridges and grooves do not need to be arc-shaped but they may have another curved shape or even be straight.

The invention claimed is:

1. Tool assembly comprising first and second tool bodies, a tool coupling interconnecting the first and second tool bodies, and a drawing member for drawing the first and second tool bodies together along a common longitudinal axis of the first and second tool bodies; the tool coupling comprising:
    a male portion disposed on one of the first and second tool bodies, and a female portion disposed in another of the first and second tool bodies and receiving the male portion, and
    a ridge disposed on one of the first and second tool bodies and a groove disposed in another of the first and second tool bodies and receiving the ridge for radially steering the first and second tool bodies during mating of the male and female portions, the ridge and the groove situated laterally outwardly of the male and female portions and spaced radially therefrom, wherein each of the ridge and the groove is arc-shaped as viewed in a direction parallel to the axis.

2. The tool assembly according to claim 1 wherein each of the ridge and the groove is formed on an axially facing contact surface of the respective tool body.

3. The tool assembly according to claim 1 wherein the ridge and the groove are respectively convexly and concavely curved as viewed in cross section therethrough.

4. The tool assembly according to claim 3 wherein the convex curvature of the ridge has a smaller radius of curvature than does the concave curvature of the groove.

5. The tool assembly according to claim 1 wherein a cross section of each of the male and female portions is of generally triangular shape.

6. The tool assembly according to claim 5, wherein the male portion comprises three corner portions interconnected by three side surfaces, at least a portion of each side surface being convex in a circumferential direction of the male portion.

7. The tool assembly according to claim 1 wherein the drawing member comprises a locking screw arranged along the axis, the locking screw including a head portion disposed in one of the first and second tool bodies, and a threaded shank threadedly secured in another of the first and second tool bodies.

8. The tool assembly according to claim 7, wherein the shank is longitudinally chamfered on its outer periphery.

9. The tool assembly according to claim 8 wherein the shank includes a groove disposed axially outside of the one tool body in which the head is disposed, a clamp ring disposed in the groove and projecting radially outwardly of the shank to pull the first and second tool bodies apart upon unscrewing of the locking screw.

10. The tool assembly according to claim 7 wherein the shank includes a groove disposed axially outside of the one tool body in which the head is disposed, a clamp ring disposed in the groove and projecting radially outwardly of the shank to pull the first and second tool bodies apart upon unscrewing of the locking screw.

11. The tool assembly according to claim 1 wherein the ridge and the male portion are both disposed on the same tool body.

12. Tool assembly comprising first and second tool bodies, a tool coupling interconnecting the first and second tool bodies, and a drawing member for drawing the first and second tool bodies together along a common longitudinal axis of the first and second tool bodies; the tool coupling comprising:
    a male portion disposed on one of the first and second tool bodies, and a female portion disposed in another of the first and second tool bodies and receiving the male portion, and
    a ridge disposed on one of the first and second tool bodies and a groove disposed in another of the first and second tool bodies and receiving the ridge for radially steering the first and second tool bodies during mating of the male and female portions, the ridge and the groove situated laterally outwardly of the male and female portions and spaced radially therefrom.

* * * * *